United States Patent
Sun et al.

(10) Patent No.: US 12,446,114 B2
(45) Date of Patent: Oct. 14, 2025

(54) DOWNLINK CONTROL FOR NON-COHERENT JOINT TRANSMISSION

(71) Applicant: Apple Inc., Cupertino, CA (US)

(72) Inventors: Haitong Sun, Irvine, CA (US); Johnson O. Sebeni, Fremont, CA (US); Zhu Ji, San Jose, CA (US); Dawei Zhang, Saratoga, CA (US); Wei Zhang, Santa Clara, CA (US); Yuchul Kim, Santa Clara, CA (US); Tianyan Pu, Cupertino, CA (US); Pengkai Zhao, San Jose, CA (US); Wei Zeng, San Diego, CA (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 17/968,916

(22) Filed: Oct. 19, 2022

(65) Prior Publication Data

US 2023/0038005 A1     Feb. 9, 2023

Related U.S. Application Data

(63) Continuation of application No. 16/579,108, filed on Sep. 23, 2019, now Pat. No. 11,516,882.
(Continued)

(51) Int. Cl.
*H04W 88/06*     (2009.01)
*H04B 7/024*     (2017.01)
(Continued)

(52) U.S. Cl.
CPC ........... *H04W 88/06* (2013.01); *H04B 7/024* (2013.01); *H04B 7/0413* (2013.01);
(Continued)

(58) Field of Classification Search
CPC . H04W 88/06; H04W 88/10; H04W 72/1273; H04W 72/23; H04W 72/12;
(Continued)

(56) References Cited

U.S. PATENT DOCUMENTS

| | | | |
|---|---|---|---|
| 11,637,666 B2 * | 4/2023 | Grant | H04L 5/0044 370/329 |
| 2012/0314665 A1 | 12/2012 | Ishida | |

(Continued)

FOREIGN PATENT DOCUMENTS

| | | |
|---|---|---|
| CN | 105265014 | 1/2016 |
| CN | 108039903 | 5/2018 |

(Continued)

OTHER PUBLICATIONS

Extended European Search Report for EP Patent Application No. 23163452.8; Sep. 4, 2023.
(Continued)

*Primary Examiner* — Ricardo H Castaneyra
(74) *Attorney, Agent, or Firm* — Kowert, Hood, Munyon, Rankin & Goetzel, P.C.

(57) ABSTRACT

Apparatuses, systems, and methods for providing downlink control for non-coherent joint transmission. A cellular base station may provide downlink control information associated with a non-coherent joint transmission downlink data communication to a wireless device, which may receive the downlink control information. The downlink control information may be provided as a single downlink control information including scheduling information for two data streams of the non-coherent joint transmission data communication, or a portion of a multi-stage downlink control information transmission. The wireless device may receive
(Continued)

the non-coherent joint transmission downlink data communication based at least in part on the downlink control information.

20 Claims, 12 Drawing Sheets

Related U.S. Application Data

(60) Provisional application No. 62/738,616, filed on Sep. 28, 2018.

(51) Int. Cl.
| | | |
|---|---|---|
| *H04B 7/0413* | (2017.01) | |
| *H04W 72/1273* | (2023.01) | |
| *H04W 72/23* | (2023.01) | |
| *H04W 88/10* | (2009.01) | |

(52) U.S. Cl.
CPC ....... *H04W 72/1273* (2013.01); *H04W 72/23* (2023.01); *H04W 88/10* (2013.01)

(58) Field of Classification Search
CPC ..... H04B 7/024; H04B 7/0413; H04L 5/0035; H04L 5/0053; H04L 5/0094; H04L 1/0028
USPC .......................................... 370/329, 252, 330
See application file for complete search history.

(56) References Cited

U.S. PATENT DOCUMENTS

| | | | |
|---|---|---|---|
| 2015/0036566 | A1 | 2/2015 | Blankenship |
| 2017/0346448 | A1 | 11/2017 | Maxim |
| 2018/0007697 | A1 | 1/2018 | Tolochko |
| 2018/0048372 | A1 | 2/2018 | Sun |
| 2018/0049037 | A1 | 2/2018 | Lopez Perez |
| 2018/0049236 | A1 | 2/2018 | Sun |
| 2018/0092129 | A1 | 3/2018 | Guo |
| 2018/0227886 | A1* | 8/2018 | Chou .................. H04B 7/0695 |
| 2018/0278387 | A1 | 9/2018 | Qi |
| 2019/0124631 | A1 | 4/2019 | Ren |
| 2020/0015203 | A1 | 1/2020 | Zhang |
| 2020/0119797 | A1 | 4/2020 | Wang |
| 2020/0221428 | A1* | 7/2020 | Moon .................. H04B 7/024 |
| 2021/0250981 | A1 | 8/2021 | Takeda |

FOREIGN PATENT DOCUMENTS

| | | |
|---|---|---|
| WO | 2018001113 | 1/2018 |
| WO | 2018063200 | 4/2018 |
| WO | 2018127145 | 7/2018 |
| WO | 2018228571 | 12/2018 |

OTHER PUBLICATIONS

Samsung "Discussion on DL/UL multi-TRP/-panel supports"; 3GPP TSG RAN WG1 Meeting 90bis R1-1717598; Oct. 9, 2017.
Ericsson "On beam indication, measurement, and reporting"; 3GPP TSG-RAN WG1 NR Ad Hoc #3 R1-1716350; Sep. 18, 2017.
Office Action for CN Patent Application No. 201910922142.6; 10 pages; Jan. 5, 2023.
Huawei et al. "DL multi-TRP/panel/beam operation in R15"; 3GPP TSG RAN WG1 Meeting #91 R1-1719814; Reno, USA; 3 pages; Nov. 27, 2017.
European Search Report from Application No. 19200197.2-1205, dated Feb. 28, 2020, Apple Inc., pp. 1-10.
Interdigital Inc., "DCI Design for Multi-TRP/Panel Transmission for DL", 3GPP Draft; R1-1710923 DCI Design for Multi-TRP Panel Transmission for DL, 3rd Generation Partnership Project (3GPP), Mobile Competence Centre; 650, Route Des Lucioles; F-06921 Sophia-Antipolisse Cede, vol. RAN WG1, No. Wingdao, China; Jun. 27, 2017-Jun. 30, 2017 Jun. 16, 2017, XP051304565, Retrieved from the Internet: URL:http://www.3gpp.org/ftp/tsg_ran/WG1_RL1/TSRG1_AH/NR_AH_1706/Docs/ [retreived on Jun. 16, 2017], three pages.
"Considerations on PDCCH Design for NCJT," Apple, 3GPP Draft; R1-1811124 Considerations on PDCCH Design for NCJT, 3rd Generation Partnership Project (3GPP), Mobile Competence Centre; 650, Route Des Lucioles; F-06921 Sophia-Antipolisse Cede, vol. RAN WG1, No. Chengdu, China; Oct. 8, 2018-Oct. 12, 2018, Sep. 29, 2018, XP051518526, Retrieved from the Internet: URL:http://www.3gpp.org/ftp/tsg%5Fran/WG1%5FRL1/TSGR1%5F946/Docs/R1%D1811124%2Ezip [retrieved on Sep. 29, 2018], six pages.
Extended European Search Report from Application No. 19200197.2-1205, dated Jul. 1, 2020, Apple Inc., 18 pages.
AT&T: "Two Stage DCI Design for NR DL Control Channel," 3GPP Draft; R1-1702274 Two Stage DCI Design for NR DL Control Channel, 3rd Generation Partnership Project (#GPP), Mobile Competence Centre; 650, Route Des Lucioles; F-06921 Sophia-Antipolis Cedex; vol. RAN WG1, No. Athens, Greece; Feb. 13, 2017-Feb. 17, 2017 (Feb. 12, 2017), XP051209429, six pages.
Huawei, et al.: "Discussion on DL MIMO Transmission," 3GPP Draft; R1-1608819. 3rd Generation Partnership Project (3GPP), Mobile Competence Centre; 650, Route Des Lucioles; F-06921 Sophia-Antipolis Cedex, France, vol. RAN WG1, No. Lisbon, Portugal; Oct. 10, 2016-Oct. 14, 2016 (Oct. 9, 2016), XP051148873, four pages.
ITRI: "Discussion on two-stage DCI for NR," 3GPP Draft; R1-1708717 Discussion on Two-Stage DCI for NR, 3rd Generation Partnership Project (3GPP), Mobile Competence Centre; 650, Route Des Lucioles; F-06921 Sophia-Antipolis Cedex, France, vol. RAN WG1, No. Hangzhou; May 12, 2017-May 19, 2017 (May 14, 2017), XP051273900, four pages.

\* cited by examiner

DOWNLINK CONTROL FOR NON-COHERENT JOINT TRANSMISSION

PRIORITY INFORMATION

This application is a continuation of U.S. patent application Ser. No. 16/579,108, entitled "Downlink Control for Non Coherent Joint Transmission," filed Sep. 23, 2019, which claims priority to U.S. provisional patent application Ser. No. 62/738,616, entitled "Downlink Control for Non-coherent Joint Transmission," filed Sep. 28, 2018, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for providing downlink control for non-coherent joint transmission.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to provide downlink control for non-coherent joint transmission.

The techniques described herein include various approaches to providing downlink control information for non-coherent joint transmission data communications, including multiple possible downlink control information formats for each of non-coherent joint transmission downlink data communications and non-coherent joint transmission uplink data communications.

The various formats for each of downlink and uplink non-coherent joint transmission data communications may include a single downlink control information transmission, a multi-stage downlink control information transmission, and/or multiple downlink control information transmissions. Providing multiple such formats may allow for substantial flexibility when scheduling and configuring non-coherent joint transmission communications.

Techniques are also described herein for facilitating determining whether non-coherent joint transmission is supported by a wireless device, and for determining when to activate or deactivate non-coherent joint transmission, e.g., based on conditions being experienced by the wireless device, among various other techniques described herein.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
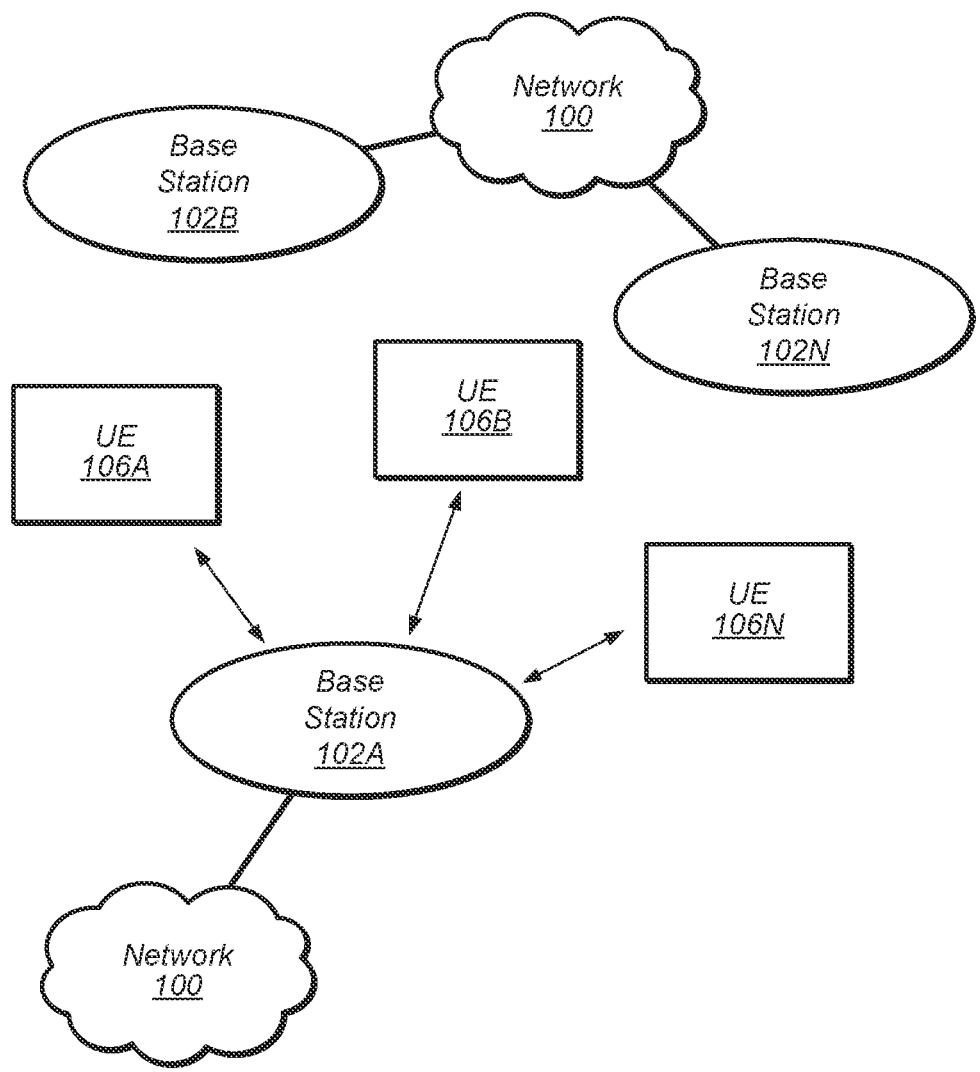
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
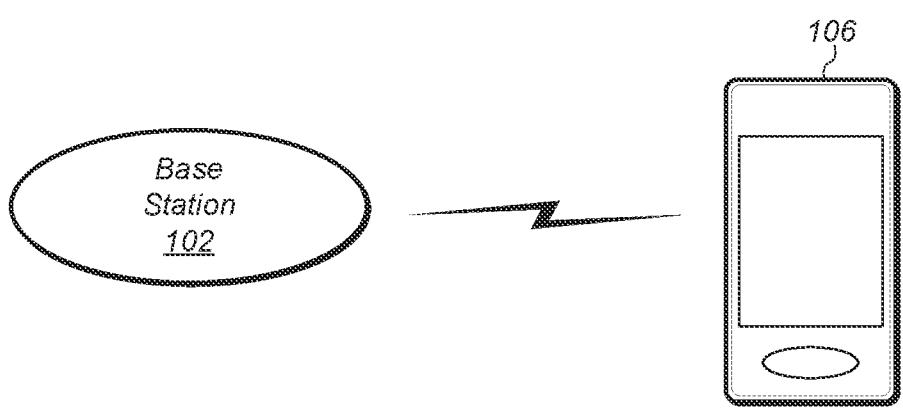
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
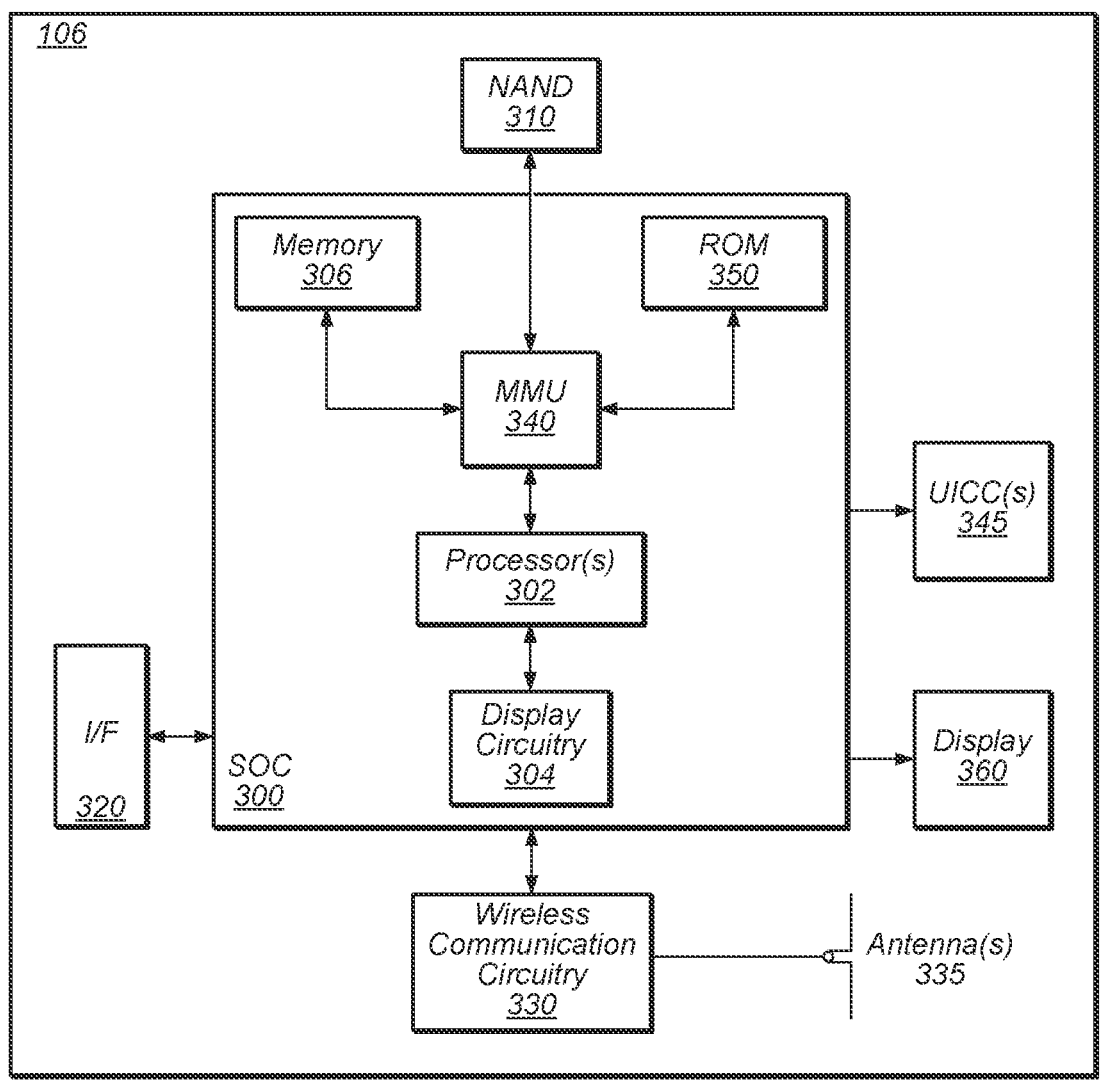
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
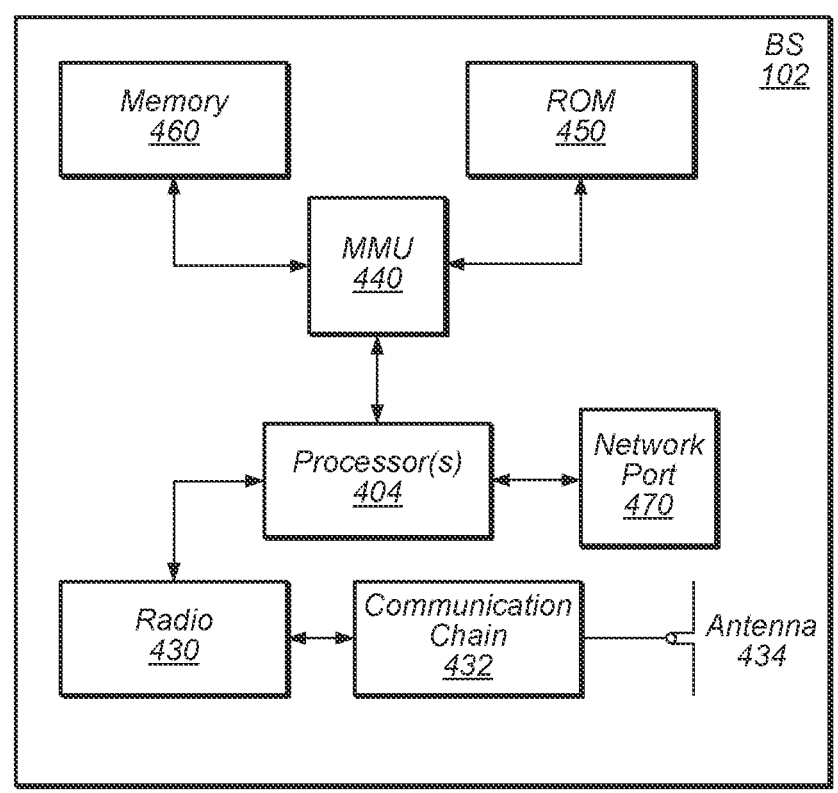
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
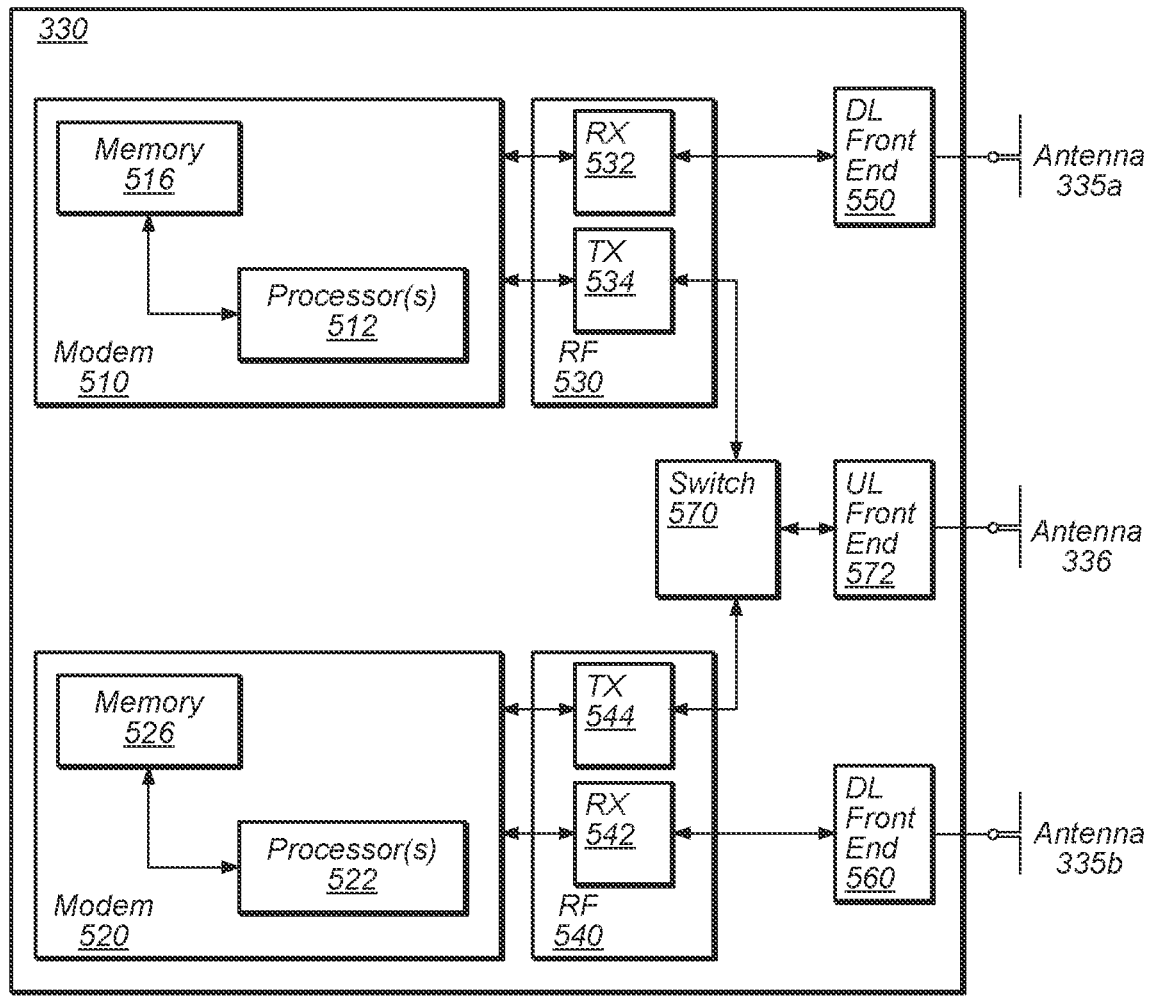
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs)

that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
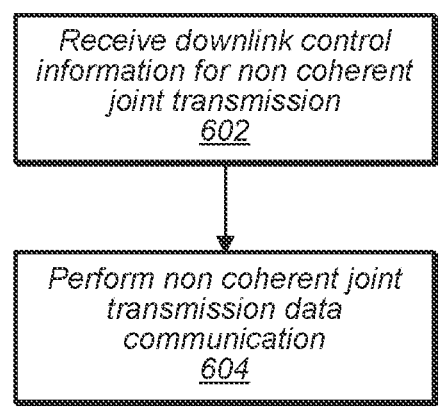
FIG. 6 is a flowchart diagram illustrating an example method for providing downlink control information for non-coherent joint transmission (NCJT), according to some embodiments.

FIG. 6—Downlink Control for Non-Coherent Joint Transmission

New cellular communication techniques are continually under development, to increase coverage, to better serve the range of demands and use cases, and for a variety of other reasons. One technique that is currently under development may include non-coherent joint transmission, in which multiple TRPs can schedule independent data streams to a wireless device without joint precoding. As part of such development, it would be useful to provide a downlink control framework that can support such a technique.

Accordingly, FIG. 6 is a signal flow diagram illustrating an example of such a method, at least according to some embodiments. Aspects of the method of FIG. 6 may be implemented by a wireless device such as a UE 106 illustrated in various of the Figures herein, a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 6 may operate as follows.

At 602, a wireless device may receive downlink control information for non-coherent joint transmission. The downlink control information may be provided in any of a variety of possible formats. At least according to some embodiments, the wireless device may receive an indication of which of multiple possible formats is being used to provide the downlink control information. For example, such information may be broadcast by a base station to which the wireless device is attached in a system information broadcast, among various other possibilities.

As one possible format, the downlink control information may be provided as a single downlink control information transmission that includes scheduling information for multiple downlink data streams of the non-coherent joint transmission data communication. In such a case, the downlink control information may include separate/independent scheduling information for each downlink data stream, or may include scheduling information that is common to the two downlink data streams and scheduling information that is specific to each of the two downlink data streams, e.g., to more efficiently communicate the scheduling information.

As another possible format, the downlink control information may be provided as a multi-stage downlink control information transmission. In such a case, the wireless device may receive a first portion of the multi-stage downlink control information transmission as well as a second portion of the multi-stage downlink control information transmission. The first portion may include scheduling information for a first downlink data stream of the non-coherent joint transmission data communication, while the second portion may include scheduling information for a second downlink data stream of the non-coherent joint transmission data communication. According to some embodiments, the first portion may include information indicating the existence of the second portion, and/or may include downlink control information configuration information for the second portion. In some instances, the second portion may omit scheduling information for the second downlink data stream that is in common with the first downlink data stream, e.g., to more efficiently signal the downlink control information. If desired, the time and frequency resources on which the second portion are provided may be predetermined relative to time and frequency resources on which the first portion are provided, e.g., to simplify the decoding process for the wireless device.

As a still further possibility, multiple downlink control information transmissions may be provided to the wireless device in conjunction with the non-coherent joint transmission data communication. For example, the downlink control information received by the wireless device may include first downlink control information for a first downlink data stream of the non-coherent joint transmission data communication and separate second downlink control information for a second downlink data stream of the non-coherent joint transmission data communication. The first downlink control information may include information indicating the existence of the second downlink control information, and the second downlink control information may include information indicating the existence of the first downlink control information. Further, the first downlink control information may include configuration information for the second downlink control information, and the second downlink control information may include configuration information for the first downlink control information, at least according to some embodiments. It may be the case that time and frequency resources on which the second downlink control information is provided are predetermined relative to time and frequency resources on which the first downlink control information is provided, e.g., to simplify the decoding process for the wireless device. In some instances, the second downlink control information may omit scheduling information for the second downlink data stream of the non-coherent joint transmission data communication that is in common with the first downlink data stream of the non-coherent joint transmission data communication.

As one possible benefit (at least according to some embodiments) of supporting a downlink control information format for non-coherent joint transmission in which multiple downlink control information transmissions are provided, such a format may possibly enable support of non-coherent joint transmission with TRPs that have a relatively low level of scheduling coordination. In such a case, it may further be beneficial to provide a mechanism for semi-statically partitioning reference signal ports between TRPs associated with a non-coherent joint transmission. For example, in a scenario in which a first downlink data stream is associated with a first TRP and a second downlink data stream is associated with a second TRP, reference signal ports may be semi-statically partitioned between the first TRP and the second TRP, and an indication of the partitioning of the reference signal ports between the first TRP and the second TRP may be provided to the wireless device.

It may also be possible for the downlink control information to be associated with a non-coherent joint transmission uplink data communication, according to some embodiments. Similar to downlink control information associated with a non-coherent joint transmission downlink data communication, there may be multiple possible formats that can be used for such downlink control information, at least according to some embodiments.

For example, as one possibility, the downlink control information may include a single downlink control information transmission scheduling a single non-coherent joint transmission uplink data communication to multiple distributed reception points.

As another possibility, the downlink control information may be a multi-stage downlink control information transmission, e.g., including a first portion that schedules a first uplink data stream to a first TRP and a second portion that schedules a second uplink data stream to a second TRP. In such a scenario, the second portion may include incremental configuration information for the second uplink data stream relative to the first uplink data stream, such that configuration information for the second uplink data stream that is in common with the first uplink data stream may be omitted from the second portion.

As a still further possibility, multiple downlink control information transmissions may be provided for the non-coherent joint transmission uplink data communication, e.g., such that the wireless device may receive first downlink control information for a first uplink data stream of the non-coherent joint transmission uplink data communication, and may separately receive second downlink control information for a second uplink data stream of the non-coherent joint transmission uplink data communication transmission.

In some instances, the downlink control information for the non-coherent joint transmission uplink data communication may include beam configuration information for the non-coherent joint transmission uplink data communication. For example, the downlink control information may include downlink reference signal index information indicating a downlink beam for a downlink reference signal, which may be considered an indication of a beam configuration to use for at least a portion of the non-coherent joint transmission uplink data communication (e.g., for an uplink data stream that is transmitted to a TRP that provides the downlink reference signal via the downlink beam). Thus, the wireless device may use the downlink beam for the downlink reference signal as an uplink beam to transmit at least a portion of the non-coherent joint transmission uplink data communication based at least in part on the downlink reference signal index information. In some instances, similar configuration information may be received for each of multiple uplink beams to be used for multiple uplink data streams of the non-coherent joint transmission uplink data communication.

In some instances, the downlink control information may potentially support a flexible MIMO layer to codeword mapping scheme. For example, the downlink control information could include any or all of MIMO layer, MIMO codeword, and/or MIMO layer-to-codeword mapping information for the non-coherent joint transmission data streams.

According to some embodiments, the downlink control information may include transmission reception point (TRP) index information for the non-coherent joint transmission downlink data communication. The TRP index information may indicate which downlink data of the non-coherent joint transmission downlink data communication is transmitted by which TRP.

At least according to some embodiments, the wireless device may exchange signaling with the cellular network to determine whether non-coherent joint transmission data communication is supported by both the wireless device and the cellular network, and/or to determine whether to activate non-coherent joint transmission data communication, e.g., as a precursor to provision of the downlink control information for the non-coherent joint transmission data communication. In such a case, the wireless device may provide capability information, such as information indicating whether the wireless device supports simultaneous multiple beam transmission, whether the wireless device can transmit non-coherent joint transmission beams associated with different antenna panels of the wireless device or the same antenna panel of the wireless device, whether the wireless device supports non-coherent joint transmission uplink communication, and/or whether the wireless device supports non-coherent joint transmission downlink communication.

If non-coherent joint transmission is supported, and support is further provided for indicating whether to activate or deactivate non-coherent joint transmission, it may further be the case that the wireless device provides a request to activate non-coherent joint transmission, e.g., if the wireless device determines non-coherent joint transmission would be beneficial. In such a scenario, the cellular base station may provide an indication to activate non-coherent joint transmission in response to the request, and the non-coherent joint transmission communication may be performed based at least in part on the request to activate non-coherent joint transmission and the indication to activate non-coherent joint transmission. The wireless device may determine to request activation of non-coherent joint transmission based on any of a variety of possible considerations, such as if the wireless device determines that a TRP strength difference between two TRPs is within a first threshold, if the wireless device determines that an uplink data buffer of the wireless device exceeds a buffer fullness threshold, and/or for any of various other possible reasons. Note additionally that it may be possible for a wireless device to support either, both, or neither of non-coherent joint transmission uplink communication and downlink communication, and/or for each of non-coherent joint transmission uplink communication and downlink communication to be activated/deactivated separately/independently or jointly, as desired.

Note that even when non-coherent joint transmission is activated, it may be possible for a given data stream to be (e.g., temporarily) disabled. For example, a field of the downlink control information could be set to a reserved value to indicate that a downlink data stream associated with that portion of the downlink control information is disabled, as one possibility. Other techniques for signaling such possible disabling of a data stream of a non-coherent joint transmission communication are also possible.

Similarly, the wireless device may be able to request deactivation of non-coherent joint transmission, e.g., if the wireless device determines non-coherent joint transmission would no longer be sufficiently beneficial. In such a scenario, the wireless device may provide a request to deactivate non-coherent joint transmission, and may receive an indication to deactivate non-coherent joint transmission in response to the request to deactivate non-coherent joint transmission. The request to deactivate non-coherent joint transmission may be based on a TRP strength difference between two TRPs exceeding a predetermined threshold, an uplink data buffer of the wireless device being below a buffer fullness threshold, and/or for any of various other possible reasons.

At 604, the wireless device may perform the non-coherent joint transmission data communication, e.g., based at least in part on the downlink control information associated with the non-coherent joint transmission data communication. For example, performing the non-coherent joint transmission data communication may include using scheduling information, configuration information, and/or other parameters/information provided in the downlink control information associated with the non-coherent joint transmission data communication.

Thus, the wireless device may receive a non-coherent joint transmission downlink data communication, e.g., if the downlink control information is associated with a non-coherent joint transmission downlink data communication. Alternatively, the wireless device may transmit a non-coherent joint transmission uplink data communication, e.g., if the downlink control information is associated with a non-coherent joint transmission uplink data communication.

FIGS. 7-16 and Additional Information

FIGS. 7-16 illustrate further aspects that might be used in conjunction with the method of FIG. 6 if desired. It should be noted, however, that the exemplary details illustrated in and described with respect to FIGS. 7-16 are not intended to be limiting to the disclosure as a whole: numerous variations and alternatives to the details provided herein below are possible and should be considered within the scope of the disclosure.

Figure 7:
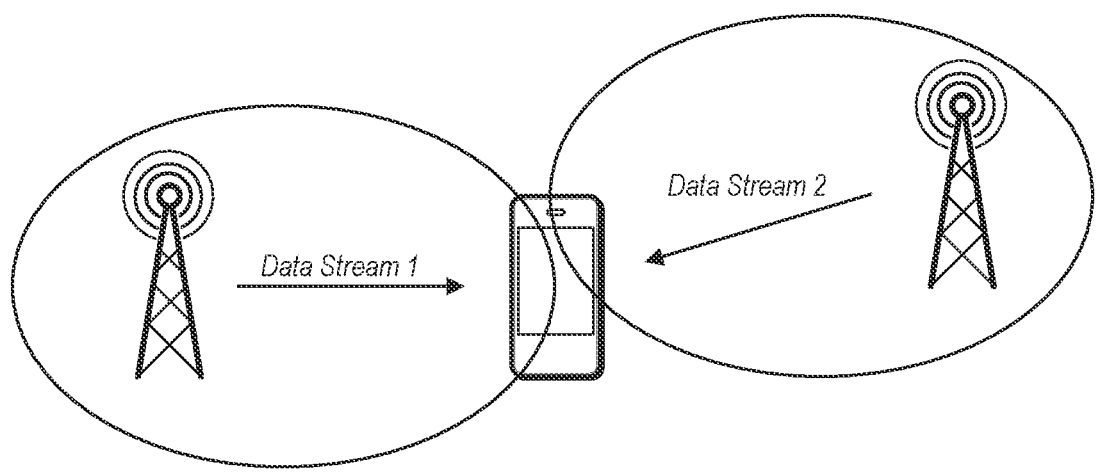
FIG. 7 illustrates an example NCJT scenario, in which two transmission reception points (TRPs) schedule two data streams to a wireless device, according to some embodiments.

Non-coherent joint transmission (NCJT) is a topic under consideration at least for 3GPP cellular communication, for example in conjunction with 3GPP release 16. FIG. 7 illustrates an example NCJT scenario, e.g., in which two TRPs schedule two data streams without joint precoding to a wireless device. Design of a non-coherent joint transmission framework may include a variety of considerations, e.g., potentially including downlink control (e.g., physical downlink control channel and DCI) design, uplink feedback (e.g., physical uplink control channel and ACK/NAK) design, channel state information reference signal (CSI-RS) configuration design, and channel state information (CSI) feedback design, among various possibilities.

Each such design area may itself include a variety of considerations. For example, for the downlink control framework, downlink DCI design and uplink DCI design may need to be considered, as well as at least some overall NCJT operation considerations.

For the downlink DCI design, there may be several possible approaches, including a single DCI design, a multi-stage DCI design, and/or a multiple DCI design.

Figure 8:
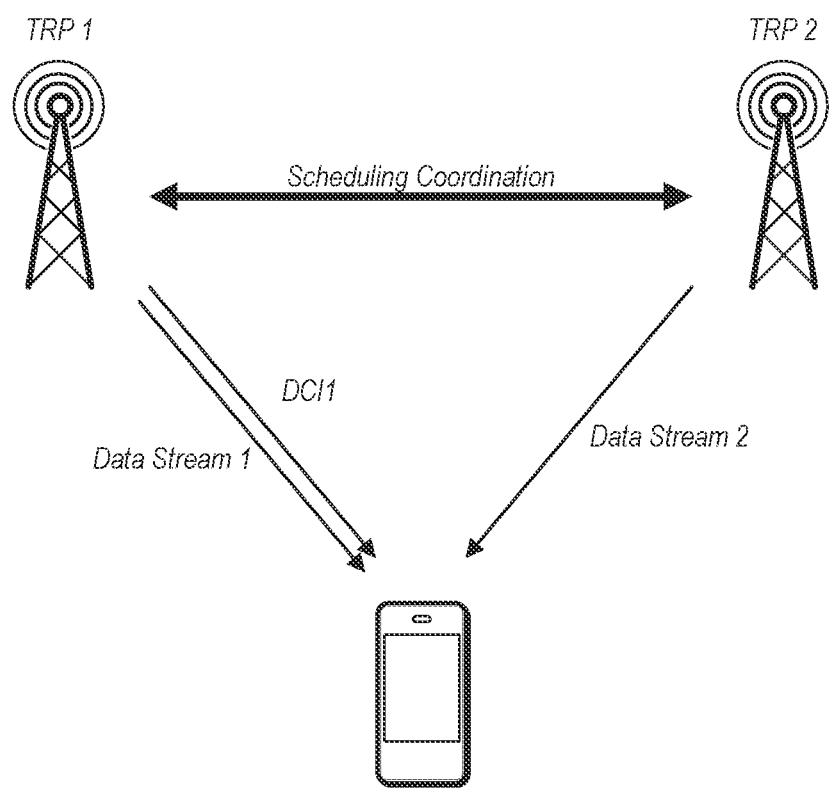
FIGS. 8-9 illustrate exemplary aspects of a possible single downlink DCI approach, according to some embodiments.

FIG. 8 illustrates exemplary aspects of a possible single DCI approach. In such an approach, a UE may decode a single DCI transmission (e.g., from just one of the multiple TRPs) with scheduling information for both data streams. As shown, such an approach may include scheduling coordination support between the TRPs, e.g., such that the TRP providing the DCI is able to provide the scheduling information for both data streams in the DCI.

Such a single DCI transmission may be formatted in a variety of ways. As one possibility, a single DCI that includes independent scheduling information for each data stream, potentially including (but not limited to) frequency/time resource allocation, modulation and coding scheme (MCS), new data indicator (NDI), redundancy version (RV), hybrid automatic repeat request (HARQ) process number, antenna port, etc.

As another possibility, a single DCI that includes some information that is in common for the two data streams and some information that is different for the two data streams could be used. For example, the two data streams might have the same frequency/time resource allocation, but different MCS/NDI/RV, HARQ process number, antenna ports, etc. It may be possible for such a format to be more compact than a format in which scheduling information for each data stream is independently provided, though some scheduling flexibility may be lost to achieve such compactness.

As a still further possibility, it may be possible to at least partially reuse an existing DCI format, but with different MIMO layer/codeword mapping to support scheduling the data streams. For example, different layers can be mapped to different TRPs, different codewords can be mapped to different TRPs. Note that to support such mappings between layers/codewords and data streams, it may be useful to provide more options/a more flexible mapping between layers and codewords, e.g., in comparison to a current NR arrangement in which 1 codeword is allocated for up to 4 MIMO layers and 2 codewords are allocated otherwise.

Note that it may be possible for multiple such single DCI formats to be supported, and for support for switching between such DCI formats to be supported, e.g., by way of radio resource control (RRC) signaling, media access control (MAC) control element (CE) signaling, or via DCI itself. As another possibility, a NCJT DCI format used by a cellular base station could be signaled as part of system information (e.g., in one or more system information blocks (SIBs)).

Figure 9:
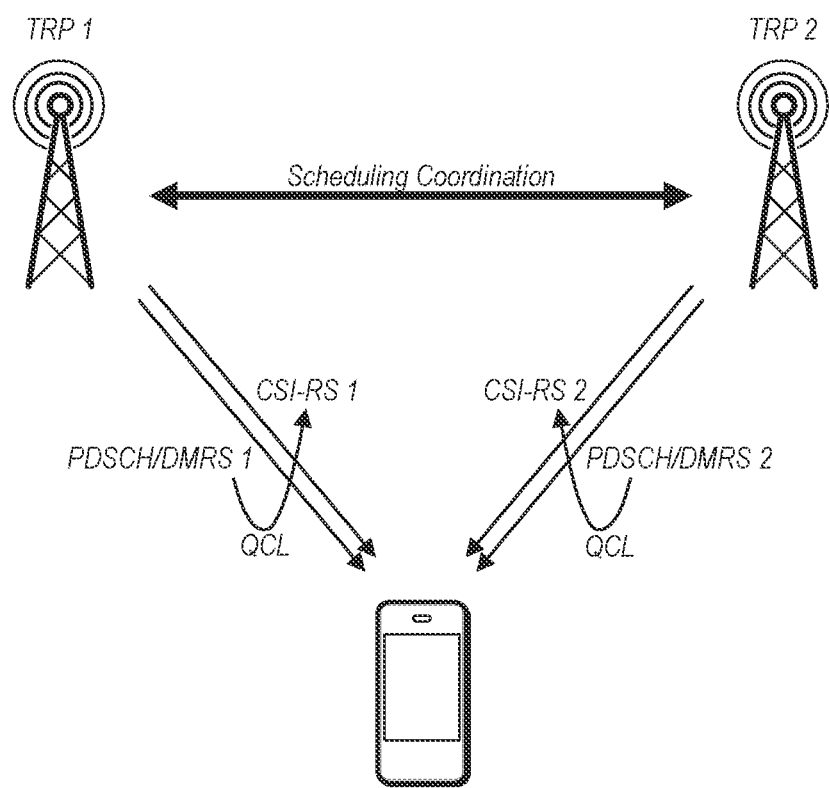

Note that for a single DCI format, the quasi-collocated (QCL) configuration may be independently configured for each TRP. QCL may allow a UE to assume that two RS share the similar channel properties (e.g., delay, doppler, etc.). Thus, since the streams from the different TRPs may generally have different channel properties, each TRP may be configured with different DMRS ports (e.g., a group of DMRS ports), and QCL information regarding DMRS that belong to each TRP, and the corresponding CSI-RS, may be independently configured. This may allow a UE to determine which CSI-RS and PDSCH/DMRS transmissions are QCL, such as illustrated in FIG. 9.

It may also be useful to support NCJT operation mode switching, e.g., such that the network is allowed to schedule a single TRP or two TRP to a UE dynamically. The DCI size for single TRP and two TRP scheduling may differ. The network can configure independent DCI for single TRP and two TRP scheduling. The single DCI can contain an explicit field that indicates which TRP is being scheduled. In some instances, a single DCI format may include a mechanism to disable a TRP by setting a selected DCI field (e.g., resource allocation, MCS/RV/NDI, etc.) to a reserved value, thereby implicitly indicating that the TRP indicated as being scheduled is actually being disabled.

Figure 10:
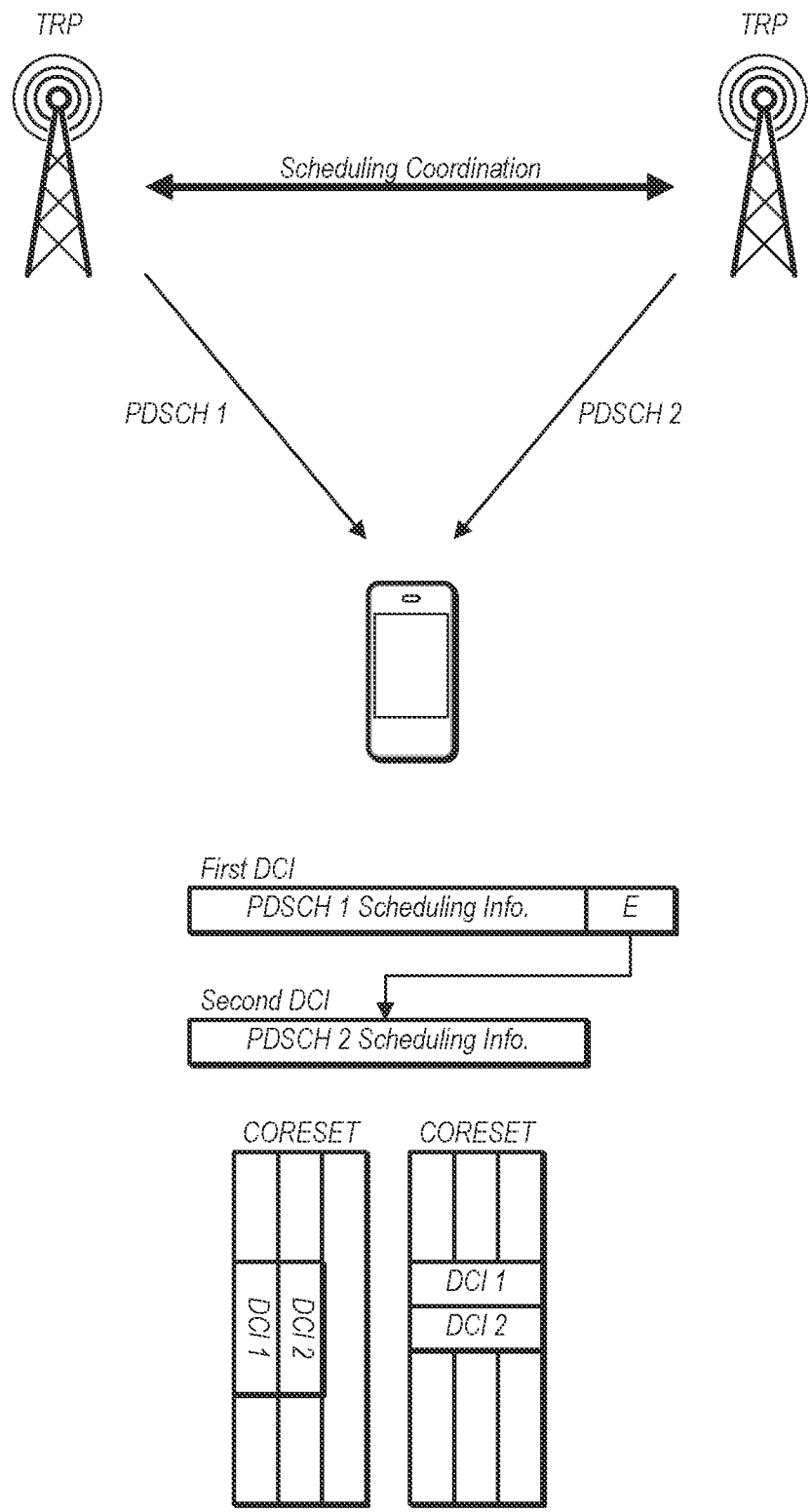
FIG. 10 illustrates exemplary aspects of a possible multi stage downlink DCI design, according to some embodiments.

As previously noted, a multi stage downlink DCI design for NCJT may also be possible. FIG. 10 illustrates exemplary aspects of one such possible multi stage downlink DCI design. In such a design, a first (e.g., main) DCI portion of the downlink control information may contain partial information for scheduling the two data streams, while a second (e.g., additional) DCI portion of the downlink control information may provide the remainder of the scheduling information, such that the full scheduling information may be available once both DCI portions have been decoded. The two DCIs may be provided by the same TRP or by different TRPs, which may in either case coordinate scheduling, as shown in FIG. 10.

As one possibility, the first DCI may contain all of the scheduling information for the data stream for one of the TRPs, as well as an extra field to indicate the presence of the second TRP and the additional DCI that will provide additional scheduling information for scheduling the data stream for the other of the TRPs. The extra field can also provide further details on the DCI configuration for the second DCI, e.g., regarding the control resource set (CORESET), aggregation level, etc., to assist the UE with decoding the second DCI.

In some instances, the second DCI can have a smaller size, e.g., as common information with the first DCI may be omitted. For example, carrier ID information, bandwidth part (BWP) information, resource allocation, rate matching, virtual resource block (VRB) mapping, physical resource block (PRB) bundling, and/or any of various other parameters could be omitted from the second DCI portion, e.g., if they are the same for the second data stream as indicated in the first DCI portion for the first data stream.

In some instances, it may be possible for the first DCI portion and the second DCI portion to have resource (e.g., frequency and/or time) allocations that are implicitly linked, such that once the first DCI portion has been decoded, a UE can readily determine the resource allocation for the second DCI portion. For example, a time division multiplexing approach in which the two DCI occupy the same frequency resource(s) in adjacent symbols could be used. As another possibility, a frequency division multiplexing approach in which the two DCI occupy adjacent frequency resources in the same symbol(s) could be used. Examples of such possible implicit resource allocation linkages are also illustrated in FIG. 10.

Figure 11:
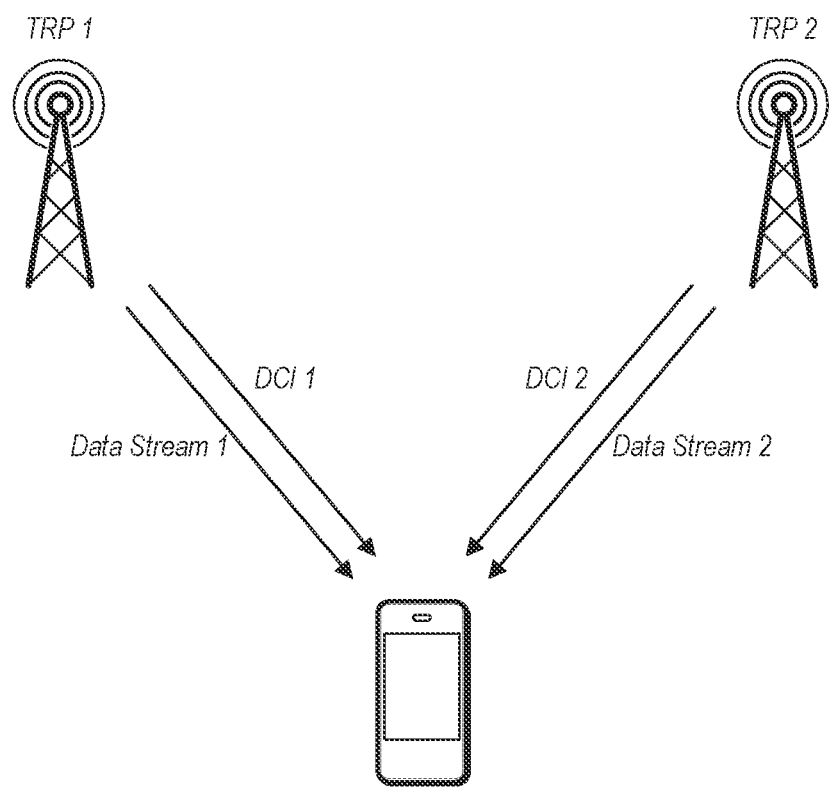
FIGS. 11-12 illustrate exemplary aspects of a possible multiple downlink DCI design, according to some embodiments.
Figure 11:
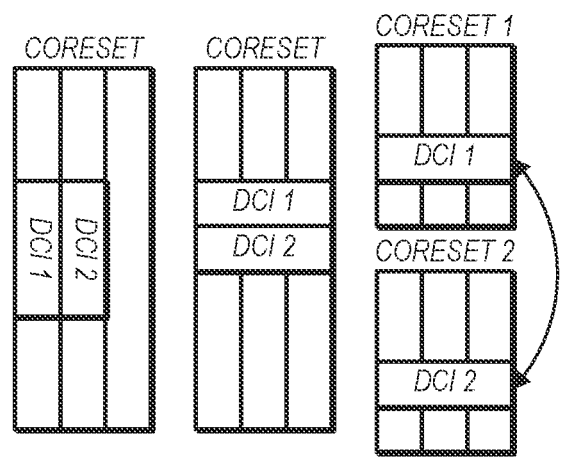
Figure 12:
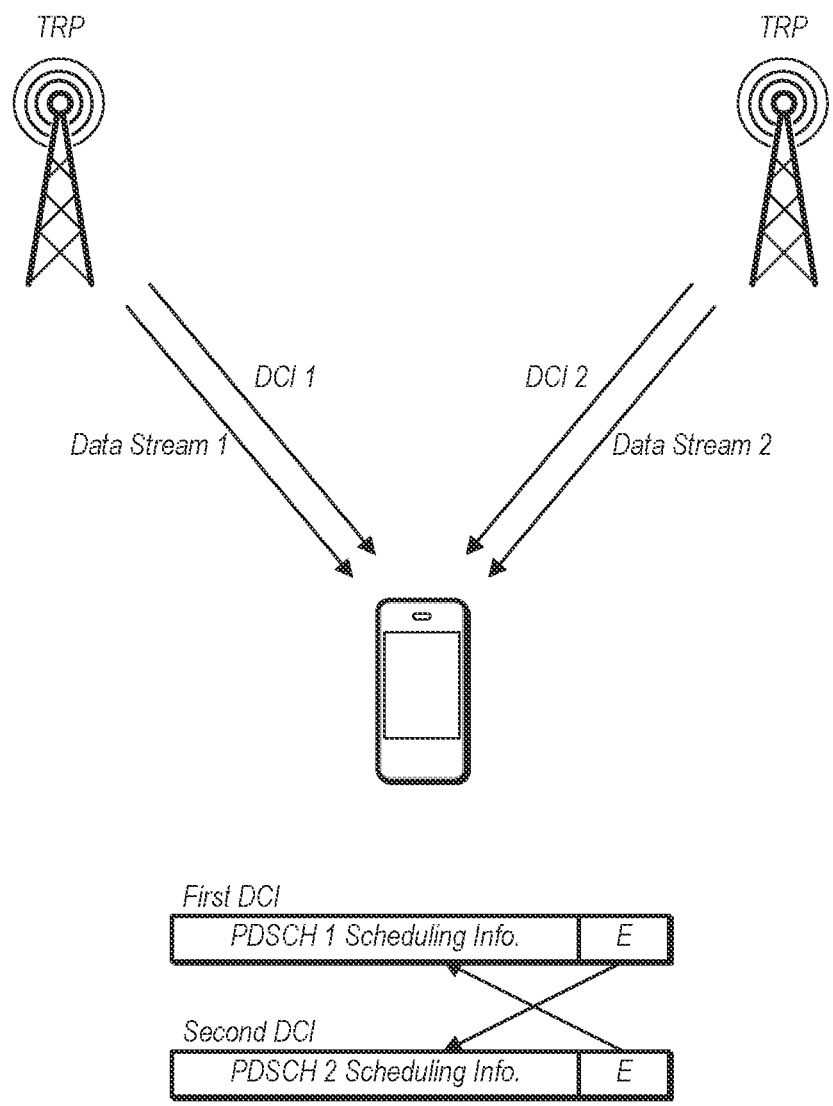

As previously noted, a downlink DCI design for NCJT in which multiple DCI are provided is also possible, e.g., such that each DCI schedules the data stream from the corresponding TRP independently. FIGS. 11-12 illustrate exemplary aspects of one such possible multiple downlink DCI design. As shown, in such a design, a first DCI provided by a first TRP may schedule a first data stream to the UE, while a second DCI provided by a second TRP may schedule a second data stream to the UE.

Such a configuration may be possible when the TRPs are not able to dynamically coordinate scheduling decisions, e.g., due to backhaul delays, and may thus be more practical in such scenarios, at least in some instances. Since the TRPs may not dynamically coordinate scheduling decisions, it may be the case that DMRS (e.g., up to 12 ports) and CSI-RS (e.g., up to 32 ports) configurations may be semi-statically configured/partitioned between the TRPs, possibly in a manner transparent to the UE. As another possibility, the semi-static partitioned DMRS ports can be signaled to the UE to reduce DCI size.

The CORESET and search space can be independently configured for each DCI. This may facilitate coexistence between NCJT and non-NCJT operation, and reduce required UE complexity. In some instances, the resource allocations for the two DCI can be implicitly linked, e.g., as shown in FIG. 11, in a time division multiplexing manner, in a frequency division multiplexing manner, or in any of various other possible ways of implicitly linking the resource allocations for the two DCI.

As shown in FIG. 12, in some instances each DCI may include an extra field (E) to indicate the existence of the other DCI. Providing such an indicator may help reduce the DCI decoding complexity e.g., by providing more details on DCI configuration, such as CORESET, aggregation level, etc., for the other DCI. Additionally or alternatively, such an indicator may help facilitate detection of DCI misdetection errors, e.g., by enabling the UE to determine when a DCI is provided but not decoded.

Note that the two DCI may have different sizes. For example, the first DCI may schedule the first TRP, including the common scheduling information between the first TRP and the second TRP. The second DCI may schedule the second TRP with only the incremental information, e.g., such that common information may be omitted. Depending on the configuration, any or all of carrier ID, BWP ID, resource allocation, rate matching, VRB mapping, PRB bundling, etc., may thus be included in the common information provided in the first DCI (e.g., if the same for both data streams) or may be included in both the first DCI and the second DCI (e.g., if different for the different data streams).

Figure 13:
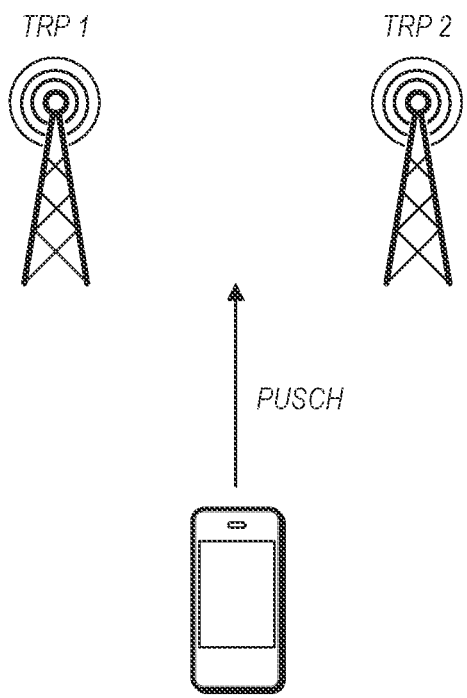
FIGS. 13-14 illustrate exemplary aspects of a possible single uplink DCI approach, according to some embodiments.

For uplink DCI, similar format possibilities may be possible as for downlink DCI, at least according to some embodiments. For example, as one possibility, a single DCI design may be used, in which a single DCI schedules an uplink data stream. FIG. 13 illustrates exemplary aspects of one such possible single uplink DCI design. In such an arrangement, the multiple TRPs can serve as distributed reception points to enhance PUSCH decoding performance.

As another possibility, a two stage uplink DCI may be used. The first stage DCI may schedule a first uplink data stream, potentially including the common scheduling information between the first uplink data stream and a second uplink data stream. The first stage DCI may also indicate the existence of a second stage DCI. The second stage DCI may schedule the incremental scheduling information for the second uplink data stream.

As still another possibility, two separate uplink DCI may be used. Each DCI may schedule an uplink data stream corresponding to an individual TRP independently.

Figure 14:
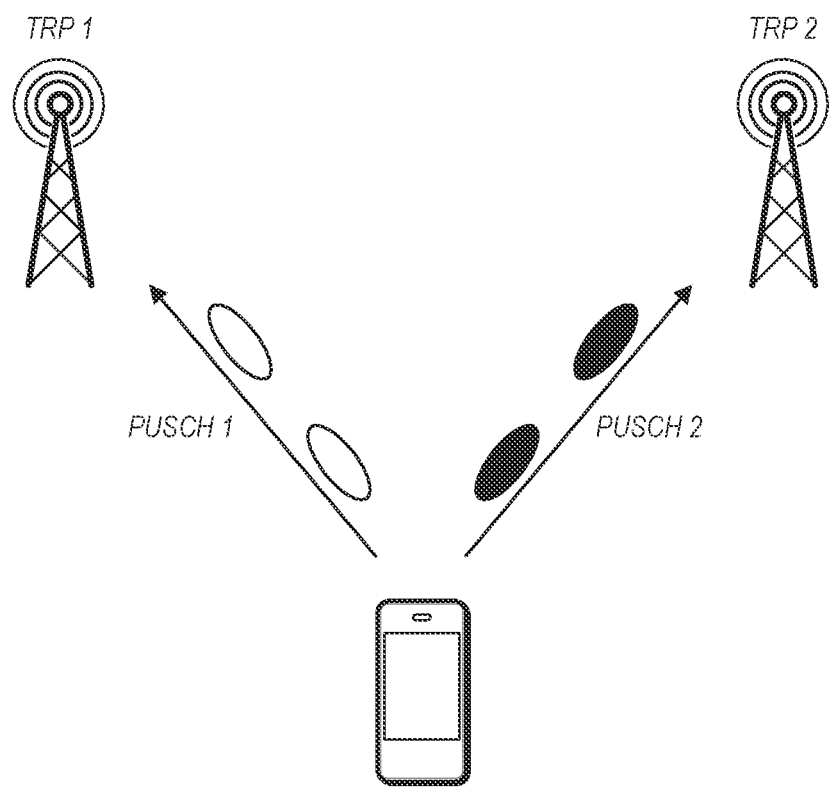

In some instances, a new transmission configuration indicator (TCI) may be provided for uplink DCI communications. The TCI may indicate a CSI-RS/SSB index. The UE may in turn use the corresponding receive beam associated with the CSI-RS/SSB index to transmit the uplink data stream. Thus, it may be possible for multiple uplink data streams to be configured with different beam configurations, e.g., as uplink streams corresponding to different TRPs may be configured with different TCI or sounding reference symbol (SRS) index (SRI) values. FIG. 14 illustrates exemplary aspects of such a configuration in which multiple uplink data streams having different beam configurations are transmitted by a UE.

Figure 15:
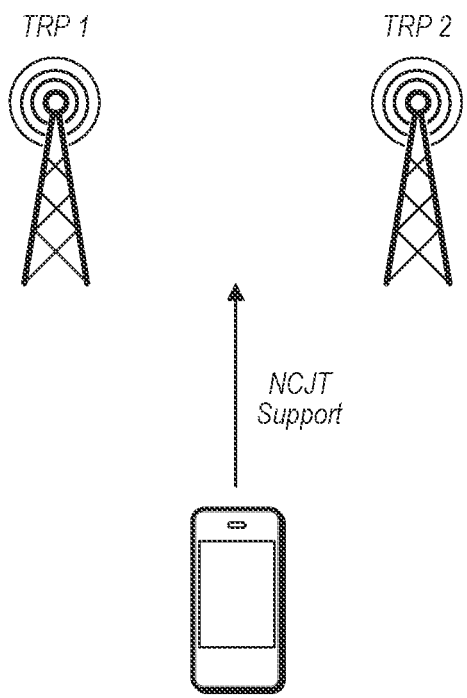
FIG. 15 illustrates exemplary aspects of an arrangement in which a UE can indicate that it supports NCJT operation, according to some embodiments.

NCJT operation may increase throughput for UE devices, while also generally increasing UE complexity and power consumption. For example, the UE may be expected to monitor multiple DCI and decode multiple physical downlink shared channels (PDSCH) simultaneously, and may need to activate multiple antenna panels in order to receive the multiple PDSCH. It may be the case that only a portion of UEs support NCJT operation, e.g., at least initially. Accordingly, it may be useful to provide a mechanism for indicating whether a UE supports NCJT. FIG. 15 illustrates exemplary aspects of such an arrangement in which a UE can indicate that it supports NCJT operation.

Additionally, given the increased complexity and power consumption of NCJT operation, a UE that is capable of NCJT operation may not always wish to enable NCJT operation. Thus, it may further be useful to provide a mechanism for a UE to signal a request to activate or deactivate NCJT for any of various reasons, such as the UE uplink buffer status (e.g., if it is lower or higher than a threshold for a certain period of time), UE battery status, UE thermal status, etc. Support for such signaling could be provided by use of temporary capability support signaling, e.g., to indicate whether a UE supports NCJT, and/or simultaneous operation of multiple antenna panels. Such signaling could be interpreted as a request (e.g., to activate NCJT if support is indicated by the UE, or to deactivate NCJT if support is not indicated by the UE) by the network.

The network may also have discretion as to whether to activate or deactivate NCJT dynamically. Such activation/deactivation could be implemented via RRC signaling, MAC-CE signaling, and/or via DCI signaling.

Figure 16:
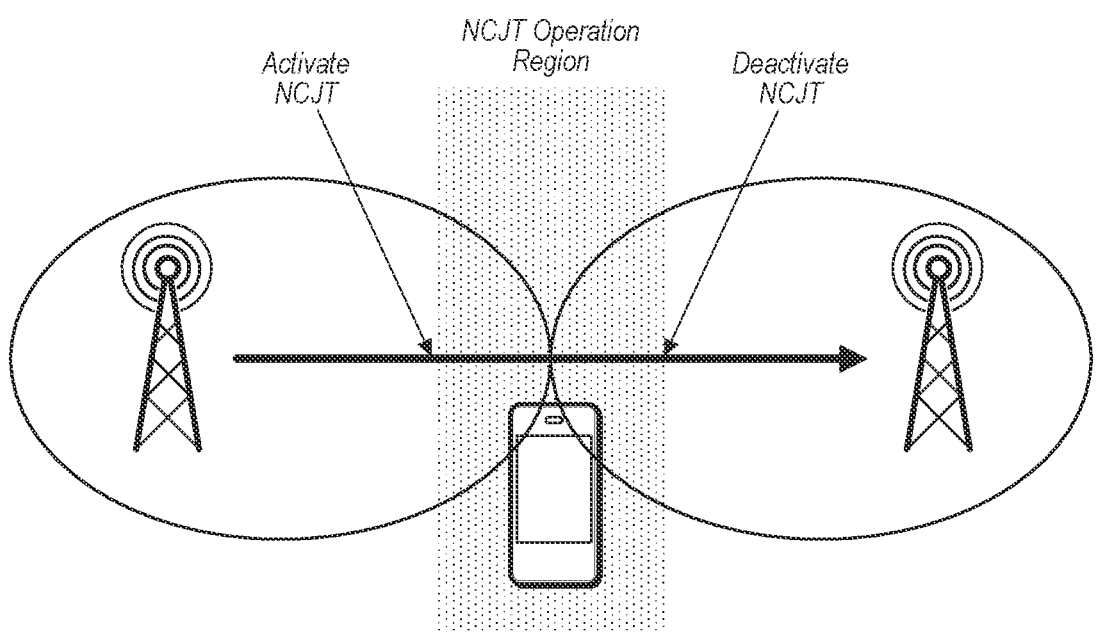
FIG. 16 illustrates how a mechanism for reporting on whether to activate/deactivate NCJT operation might proceed in an exemplary possible UE mobility scenario, according to some embodiments.

If desired, the network could also configure measurement reports to help with the decision whether to activate or deactivate NCJT. For example, at least according to some embodiments, NCJT operation may be most effective when the difference between signal strength/quality for two TRPs is relatively small at a UE, and may be less effective when the difference between signal strength/quality for two TRPs is relatively large. Thus, a UE could be configured to report when the measurement difference for two TRPs is within a threshold (hysteresis) for a certain period of time (time to trigger), which could be taken under consideration as an indicator in favor of activating (or conversely against deactivating) NCJT by the network. Similarly, a UE could be configured to report when the measurement difference for two TRPs exceeds a threshold (hysteresis) for a certain period of time (time to trigger), which could be taken under consideration as an indicator in favor of deactivating (or conversely against activating) NCJT by the network. FIG. 16 illustrates how such a reporting mechanism might proceed in an exemplary possible UE mobility scenario, as an example.

The network could also or alternatively configure UE reporting when the UE uplink buffer is lower than a certain threshold, and/or higher than a certain (e.g., same or different) threshold, for a certain period of time, as an indicator regarding whether to activate/deactivate NCJT operation for the UE. The network may also or alternatively consider the downlink buffer status (e.g., similarly whether its size is lower or higher than one or more thresholds for a certain period of time) for a UE as an indicator regarding whether to activate/deactivate NCJT operation for the UE.

Note that activation and deactivation of NCJT can be configured independently for each BWP for a UE, if desired.

When NCJT operation is activated, each TRP may have its own independent HARQ entity (with each HARQ entity containing multiple HARQ processes), at least according to some embodiments. For each data stream scheduling, the DCI may indicate a TRP index, which can be used to schedule cross TRP retransmissions, if desired.

Note that independent receive and transmit beam configurations can be used for the PDSCH/PUSCH corresponding to an individual TRP. Thus, each PDSCH can be configured with its own TCI, and each PUSCH can be configured with its own SRI.

In some embodiments, UE measurement reporting may include whether multiple beams can be received or transmitted simultaneously. The report could be different for RX and TX, for example, if the two beams are supported for simultaneous reception but not transmission, or vice versa. Additionally or alternatively, reporting on whether beams belong to the same or different antenna panels could be supported/configured. Such reporting may be useful, at least in some instances, as beams in the same antenna panel may require less switching time compared to beams in different antenna panels. This may in turn affect scheduling, or possibly even whether the multiple beams are supported.

In the following further exemplary embodiments are provided.

One set of embodiments may include a method, comprising: by a wireless device: receiving downlink control information associated with a non-coherent joint transmission downlink data communication; and receive the non-coherent joint transmission downlink data communication based at least in part on the downlink control information.

Another set of embodiments may include a method, comprising: by a cellular base station: providing downlink control information associated with a non-coherent joint transmission downlink data communication to a wireless device; and transmitting a first portion of the non-coherent joint transmission downlink data communication.

According to some embodiments, the downlink control information comprises downlink a single downlink control information transmission comprising scheduling information for two data streams of the non-coherent joint transmission data communication.

According to some embodiments, the downlink control information comprises independent scheduling information for the two data streams.

According to some embodiments, the downlink control information comprises scheduling information that is common to the two data streams and scheduling information that is specific to each of the two data streams.

According to some embodiments, the downlink control information comprises multiple input multiple output (MIMO) layer and/or codeword mapping information for the two data streams.

According to some embodiments, the downlink control information comprises multiple input multiple output (MIMO) layer to codeword mapping information for the two data streams.

According to some embodiments, an indication of a downlink control information format for the downlink control information transmission is provided to the wireless device.

According to some embodiments, the downlink control information comprises transmission reception point (TRP) index information for the non-coherent joint transmission downlink data communication, wherein the TRP index information indicates which downlink data of the non-coherent joint transmission downlink data communication is transmitted by which TRP.

According to some embodiments, at least one field of the downlink control information is set to a reserved value to indicate that a downlink data stream associated with that portion of the downlink control information is disabled.

According to some embodiments, the downlink control information comprises a first portion of a multi-stage downlink control information transmission, wherein a second portion of the multi-stage downlink control information transmission is also provided to the wireless device.

According to some embodiments, the first portion comprises scheduling information for a first data stream of the non-coherent joint transmission data communication, wherein the second portion comprises scheduling information for a second data stream of the non-coherent joint transmission data communication.

According to some embodiments, the first portion comprises information indicating the existence of the second portion.

According to some embodiments, the first portion comprises downlink control information configuration information for the second portion.

According to some embodiments, time and frequency resources on which the second portion are provided are predetermined relative to time and frequency resources on which the first portion are provided.

According to some embodiments, the second portion omits scheduling information for the second data stream of the non-coherent joint transmission data communication that is in common with the first data stream of the non-coherent joint transmission data communication.

According to some embodiments, the downlink control information comprises first downlink control information for a first data stream of the non-coherent joint transmission data communication, wherein second downlink control information for a second data stream of the non-coherent joint transmission data communication transmission is separately provided to the wireless device.

According to some embodiments, downlink control information configuration for the first downlink control information and the second downlink control information are independently configured.

According to some embodiments, time and frequency resources on which the second downlink control information is provided are predetermined relative to time and frequency resources on which the first downlink control information is provided.

According to some embodiments, the first downlink control information comprises information indicating the existence of the second downlink control information, wherein the second downlink control information comprises information indicating the existence of the first downlink control information.

According to some embodiments, the first downlink control information comprises configuration information for the second downlink control information, wherein the second downlink control information comprises configuration information for the first downlink control information.

According to some embodiments, the second downlink control information omits scheduling information for the second data stream of the non-coherent joint transmission data communication that is in common with the first data stream of the non-coherent joint transmission data communication.

According to some embodiments, the first data stream is associated with a first transmission reception point (TRP), wherein the second data stream is associated with a second TRP, wherein reference signal ports are semi-statically partitioned between the first TRP and the second TRP, wherein an indication of the partitioning of the reference signal ports between the first TRP and the second TRP is provided to the wireless device.

Yet another set of embodiments may include a method, comprising: by a wireless device: receiving downlink control information associated with a non-coherent joint transmission uplink data communication; and transmitting the non-coherent joint transmission uplink data communication based at least in part on the downlink control information.

Still another set of embodiments may include a method, comprising: by a cellular base station: providing downlink control information associated with a non-coherent joint transmission uplink data communication to a wireless device; and receiving at least a first portion of the non-coherent joint transmission uplink data communication.

According to some embodiments, the downlink control information comprises a single downlink control information transmission scheduling a single non-coherent joint transmission data communication to multiple distributed reception points.

According to some embodiments, the downlink control information comprises a first portion of a multi-stage downlink control information transmission, wherein the first portion schedules a first uplink data stream to a first transmission reception point (TRP), wherein a second portion of the multi-stage downlink control information transmission is also provided to the wireless device, wherein the second portion schedules a second uplink data stream to a second TRP, wherein the second portion comprises incremental configuration information for the second uplink data stream relative to the first uplink data stream, wherein configuration information for the second uplink data stream that is in common with the first uplink data stream is omitted from the second portion.

According to some embodiments, the downlink control information comprises first downlink control information for a first uplink data stream of the non-coherent joint transmission uplink data communication, wherein second downlink control information for a second uplink data stream of the non-coherent joint transmission uplink data communication transmission is separately provided to the wireless device.

According to some embodiments, the downlink control information comprises beam configuration information for the non-coherent joint transmission uplink data communication.

According to some embodiments, the downlink control information comprises downlink reference signal index information indicating a downlink beam for a downlink reference signal, wherein the downlink beam for the downlink reference signal is also used as an uplink beam to transmit at least a portion of the non-coherent joint transmission uplink data communication based at least in part on the downlink reference signal index information.

According to some embodiments, the wireless device provides a request to activate non-coherent joint transmission, wherein the cellular base station provides an indication to activate non-coherent joint transmission, wherein the non-coherent joint transmission communication is performed based at least in part on the request to activate non-coherent joint transmission and the indication to activate non-coherent joint transmission.

According to some embodiments, the request to activate non-coherent joint transmission is based at least in part on one or more of: the wireless device determining that a transmission reception point (TRP) strength difference between two TRPs is within a first threshold; or the wireless device determining that an uplink data buffer of the wireless device exceeds a buffer fullness threshold.

According to some embodiments, at a later time, the wireless device provides a request to deactivate non-coherent joint transmission, wherein, at the later time, the cellular base station provides an indication to deactivate non-coherent joint transmission.

According to some embodiments, the request to deactivate non-coherent joint transmission is based at least in part on one or more of: the wireless device determining that a transmission reception point (TRP) strength difference between two TRPs exceeds a predetermined threshold; or the wireless device determining that an uplink data buffer of the wireless device is below a buffer fullness threshold.

According to some embodiments, the wireless device provides information indicating whether the wireless device supports simultaneous multiple beam transmission.

According to some embodiments, the wireless device provides information indicating whether beams of the non-coherent joint transmission are associated with different antenna panels of the wireless device or the same antenna panel of the wireless device.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising, by baseband processor of a wireless device:
   receiving first downlink control information (DCI) scheduling a first data stream of a first uplink data communication,
   receiving second DCI scheduling a second data stream of a second uplink data communication, wherein transmission of the first and second uplink data streams include simultaneous transmission using two transmission beams; and
   transmitting the first and second data streams according to respective scheduling of the first and second DCI;
   wherein respective physical uplink shared channels (PUSCHs) of the first and second data streams are configured with distinct transmission configuration indicators (TCIs) in the respective scheduling of the first and second DCI, wherein the first and second data streams are transmitted on corresponding beams associated with channel state information-reference signal/synchronization signal block (CSI-RS/SSB) indices indicated by the distinct TCIs.

2. The method of claim 1,
   wherein a resource allocation of the first DCI is linked to a resource allocation of the second DCI.

3. The method of claim 2,
   wherein the resource allocation of the first DCI is linked to the resource allocation of the second DCI in a time division multiplexing manner or a frequency division multiplexing manner.

4. The method of claim 1,
   wherein a respective control resource set (CORESET) and a respective search space are independently configured for each of the first DCI and the second DCI.

5. The method of claim 1,
   wherein the first data stream is transmitted to a first transmission reception point (TRP), and
   wherein the second data stream is transmitted to a second TRP.

6. The method of claim 1,
   wherein the first DCI comprises information indicating the existence of the second DCI,
   wherein the first DCI comprises DCI configuration information for the second DCI, and
   wherein the second DCI omits scheduling information for the second data stream that is in common with the first data stream.

7. The method of claim 1,
   wherein the distinct TCI for the first DCI indicates a first channel state information reference signal (CSI-RS) associated with a first receive beam,
   wherein the distinct TCI for the second DCI indicates a second CSI-RS associated with a second receive beam,
   wherein the first data stream is transmitted via the first receive beam, and
   wherein the second data stream is transmitted via the second receive beam.

8. An apparatus, comprising:
   a processor configured to cause a wireless device to:
   receive first downlink control information (DCI) scheduling a first data stream of a first uplink data communication, receive second DCI scheduling a second data stream of a second uplink data communication, wherein transmission of the first and second uplink data streams include simultaneous transmission using two transmission beams; and transmit the first and second data streams according to respective scheduling of the first and second DCI;

wherein respective physical uplink shared channels (PUSCHs) of the first and second data streams are configured with distinct transmission configuration indicators (TCIs) in the respective scheduling of the first and second DCI, wherein the first and second data streams are transmitted on corresponding beams associated with channel state information-reference signal/synchronization signal block (CSI-RS/SSB) indices indicated by the distinct TCIs.

9. The apparatus of claim 8, wherein a resource allocation of the first DCI is linked to a resource allocation of the second DCI.

10. The apparatus of claim 9, wherein the resource allocation of the first DCI is linked to the resource allocation of the second DCI in a time division multiplexing manner or a frequency division multiplexing manner.

11. The apparatus of claim 8, wherein a respective control resource set (CORESET) and a respective search space are independently configured for each of the first DCI and the second DCI.

12. The apparatus of claim 8, wherein the first data stream is transmitted to a first transmission reception point (TRP), and wherein the second data stream is transmitted to a second TRP.

13. The apparatus of claim 8, wherein the first DCI comprises information indicating the existence of the second DCI, wherein the first DCI comprises DCI configuration information for the second DCI, and wherein the second DCI omits scheduling information for the second data stream that is in common with the first data stream.

14. The apparatus of claim 8, wherein the distinct TCI for the first DCI indicates a first channel state information reference signal (CSI-RS) associated with a first receive beam, wherein the distinct TCI for the second DCI indicates a second CSI-RS associated with a second receive beam, wherein the first data stream is transmitted via the first receive beam, and wherein the second data stream is transmitted via the second receive beam.

15. A non-transitory computer-readable memory medium storing program instructions which, when executed by a baseband processor, cause a base station to:

transmit first downlink control information (DCI) scheduling a first data stream of a first uplink data communication associated with a first transmission reception point (TRP);

transmit second DCI scheduling a second data stream of a second uplink data communication associated with a second TRP, wherein transmission of the first and second uplink data streams include simultaneous transmission using two transmission beams; and receive the first and second data streams from a user equipment (UE) according to respective scheduling of the first and second DCI, wherein respective physical uplink shared channels (PUSCHs) of the first and second data streams are configured with distinct transmission configuration indicators (TCIs) in the respective scheduling of the first and second DCI, wherein the first and second data streams are transmitted on corresponding beams associated with channel state information-reference signal/synchronization signal block (CSI-RS/SSB) indices indicated by the distinct TCIs.

16. The non-transitory computer-readable memory medium of claim 15, wherein a resource allocation of the first DCI is linked to a resource allocation of the second DCI.

17. The non-transitory computer-readable memory medium of claim 16, wherein the resource allocation of the first DCI is linked to the resource allocation of the second DCI in a time division multiplexing manner or a frequency division multiplexing manner.

18. The non-transitory computer-readable memory medium of claim 15, wherein a respective control resource set (CORESET) and a respective search space are independently configured for each of the first DCI and the second DCI.

19. The non-transitory computer-readable memory medium of claim 15, wherein the first data stream is transmitted by the first TRP, and wherein the second data stream is transmitted by the second TRP.

20. The non-transitory computer-readable memory medium of claim 15, wherein the first DCI comprises information indicating the existence of the second DCI, wherein the first DCI comprises DCI configuration information for the second DCI, and wherein the second DCI omits scheduling information for the second data stream that is in common with the first data stream.

* * * * *